May 8, 1928.

C. E. JENKINS 1,669,246

FOOD CONVEYING APPARATUS

Filed Nov. 8, 1922

INVENTOR
Charles E. Jenkins
BY
his ATTORNEY

May 8, 1928.  
C. E. JENKINS  
FOOD CONVEYING APPARATUS  
Filed Nov. 8, 1922  
1,669,246  
2 Sheets-Sheet 2

INVENTOR:  
Charles E. Jenkins  
BY J. H. McCrady  
his ATTORNEY

Patented May 8, 1928.

1,669,246

UNITED STATES PATENT OFFICE.

CHARLES E. JENKINS, OF BOSTON, MASSACHUSETTS.

FOOD-CONVEYING APPARATUS.

Application filed November 8, 1922. Serial No. 599,730.

This invention relates to apparatus for preparing and serving food. It is especially concerned with apparatus for keeping food at substantially the desired temperature while it is being transported from one point to another, as for instance, from the kitchen to a ward or serving room of a hospital.

The invention aims to devise an apparatus of this character which will be particularly efficient, will be convenient to use, can be manufactured economically, and which can be kept in an absolutely clean and sanitary condition.

The nature of the invention will be readily understood from the following description when read in connection with the accompanying drawings, and the novel features will be particularly pointed out in the appended claims.

Referring now to the drawings.

The apparatus shown comprises a truck including a body, the frame of which is made of angle iron or other metal bars having an angular cross section. The angular bars are connected by sheet metal plates to form a structure of the desired dimensions. This body includes four angular members, designated at 3, Figs. 1 and 2, which project upwardly from the four corners of the body and the two angle members at the front and rear are connected by an angle bar 4.

Seated on the two angle bars 4—4 and positioned between the four corner members 3, is a box or casing 5 having a series of pockets formed therein to receive food containers. The casing preferably is made of sheet metal, and each pocket has two walls with an air space between them.

Figure 4:
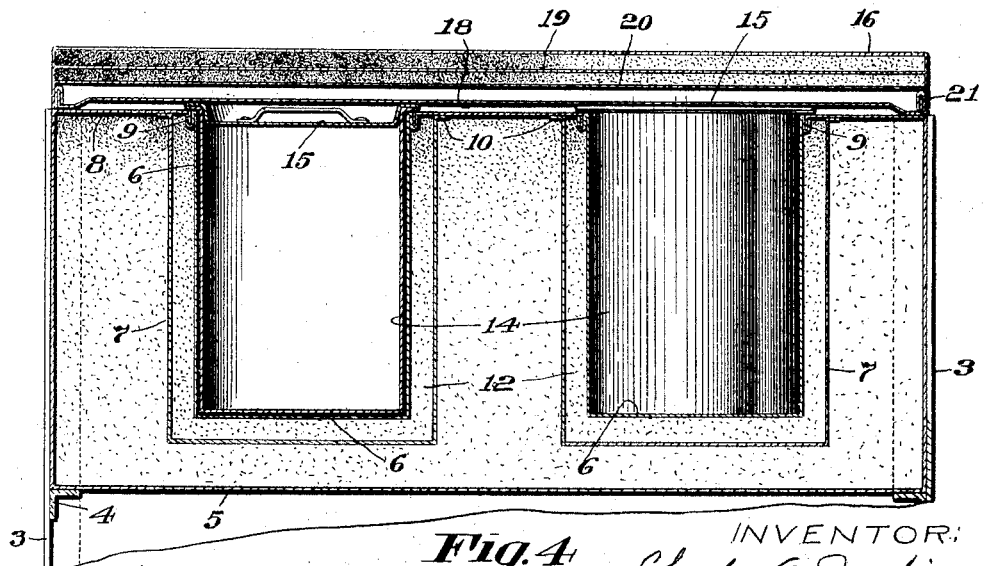
Fig. 4 is a cross sectional view through the upper part of the apparatus showing certain details of construction.

Referring to Fig. 4, it will be seen that these pockets are made by placing two vessels 6 and 7, respectively, one within the other, the inner vessel 6 being smaller in depth and diameter than the outer vessel 7. These vessels may consist simply of metal cans. The upper end of the inner vessel 6 is joind to the top sheet 8 of the casing by a telescope or interlocked joint 9 which is soldered or similarly sealed, and the edge of the outer vessel 7 is soldered to the plate 8 at 10. This provides a sealed air space 12 between the inner and outer vessels 6 and 7. Preferably, although not necessarily, this space is filled with ground cork or other suitable heat insulating material, and the space in the casing 5 between adjacent vessels 7 is also filled with ground cork or the like, as clearly shown in Fig. 4.

The food to be prepared or served is placed in cans or containers, preferably of the construction shown at 14 in Fig. 4. These containers fit snugly within the inner vessel 6, and the upper end of each container is closed by a cover 15 that fits snugly within the top of the container.

For the purpose of reducing so far as possible the radiation of heat from the food containers, a heat insulating cover is provided, preferably made in two sections designated at 16 and 17, respectively, these sections being hinged to the opposite ends of the casing 5. The construction of this cover is best shown in Fig. 4, from which it will be seen that it is a hollow sheet metal structure including an inner plate 18 and intermediate plates 19 and 20. The two intermediate plates are soldered to the edge portion of the main body of the cover, while the inner plate 18 is connected to the main portion of the cover by a telescope joint 21 which is soldered. This provides a sealed air space between the plates 18 and 20. The space between the plates 19 and 20 and between the plate 19 and the outermost plate are preferably filled with heat insulating material, such as ground cork.

It should be noted that the innermost plate 18 of the cover has a raised margin and an inset central portion so that when this cover is in its closed position, as shown in Fig. 4, it will fit snugly against the marginal portion of the top of the casing 5, while the central portion of the plate 18 will bear on the covers 15 of the food containers and hold them securely in place. This arrangement enables the plate 18 to yield or spring to accommodate itself to variations in the positions of the covers 15. Each cover 16 is provided with suitable handles 22 and with locking lugs 23 designed to cooperate with locking levers 24 of the toggle type to clamp the cover securely in its closed position. Two curved links 25—25 are pivotally secured to opposite sides of each of the covers, and are slotted to receive pins 26 which project from the sides of the casing 5, these parts serving to limit the opening movement of the covers.

It will be understood that the number, form, arrangement and dimensions of the food containing pockets may vary with the requirements of each individual case, and that the constructions therefore differ in these particulars according to the circumstances. Inasmuch as the casing 5 is removably supported in the body of the truck, the same style of truck can readily be fitted with any suitable design of food casing.

Figure 1:
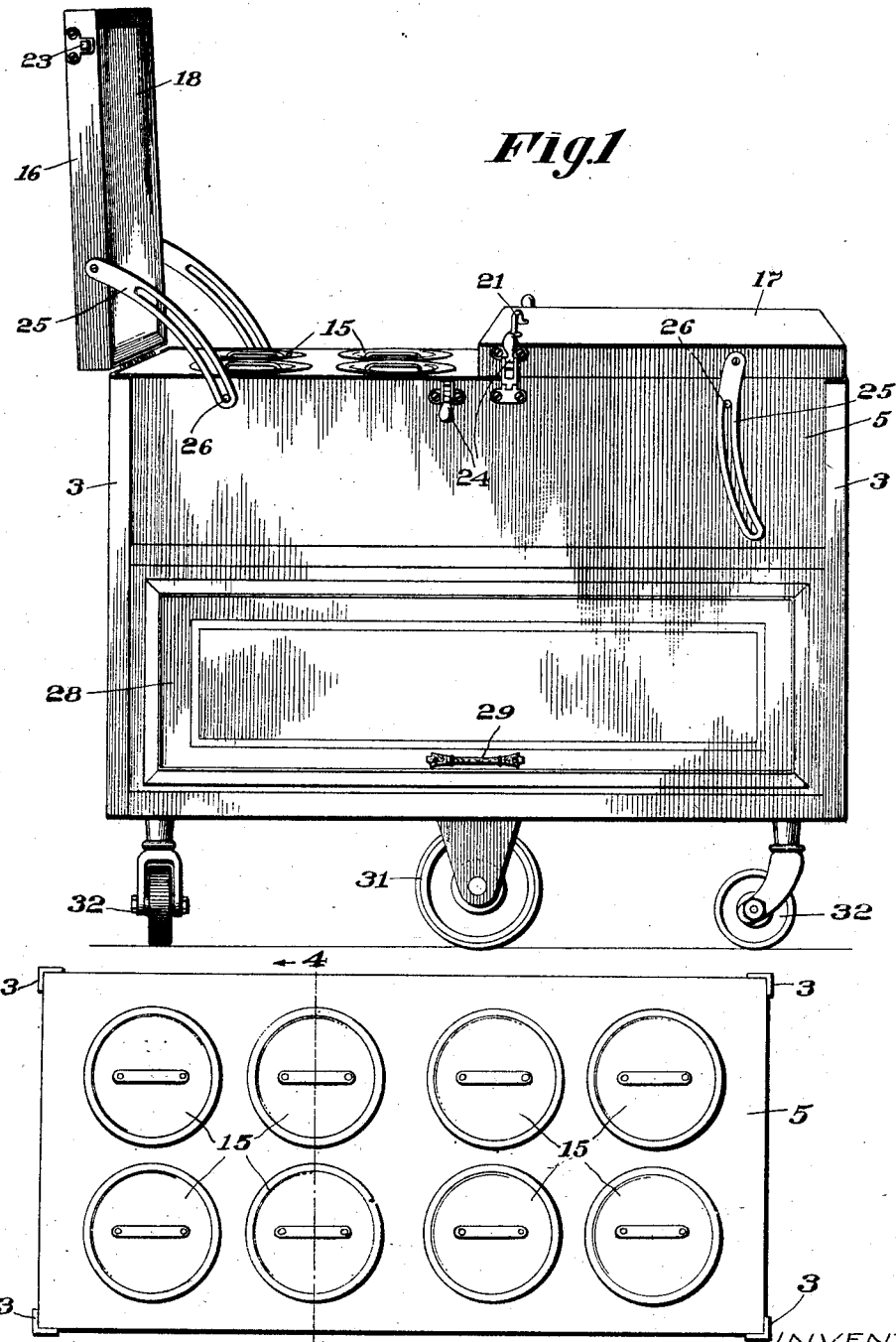
Figure 1 is a perspective view of an apparatus constructed in accordance with this invention.
Figure 2:
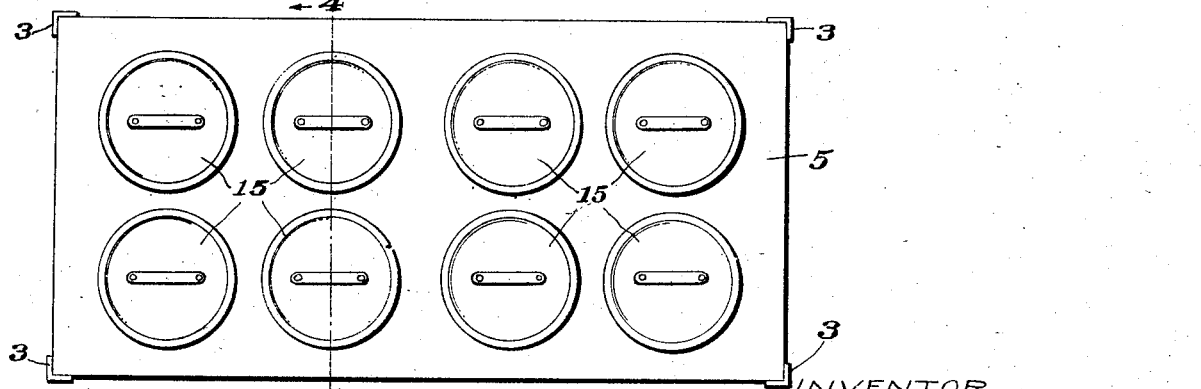
Fig. 2 is a plan view of the casing forming a portion of the apparatus shown in Fig. 1.
Figure 3:
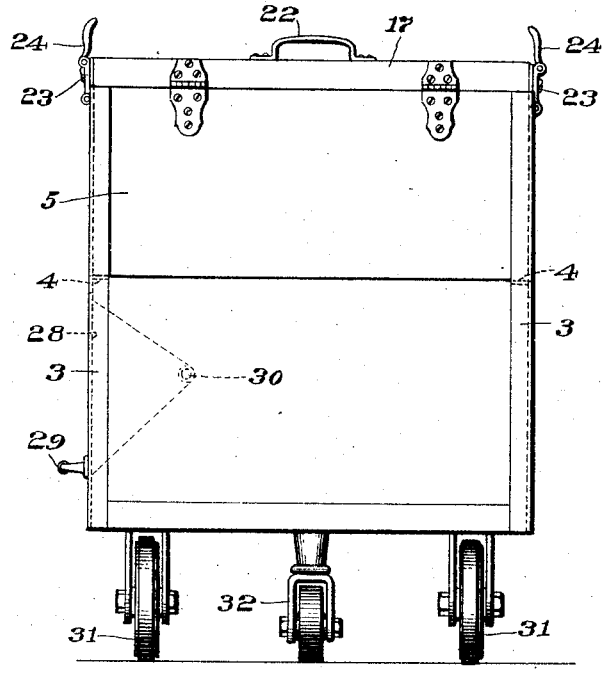
Fig. 3 is an end view of the apparatus shown in Fig. 1.

A considerable space is provided in the truck body below the casing 5, and this space may be divided by suitable partitions and shelves to suit the requirements of each individual case. Usually this space is employed to carry the dishes on which the food is to be served. In some instances it is desired that this chamber be left open at one side, while in others it is closed by a door. Figs. 1 and 3 show such a door or cover 28 provided with a handle 29 and hinged at 30, Fig. 3, so that it can be tipped upwardly into a horizontal open position. In some cases, however, sliding doors are provided and in others a drop door hinged at its lower edge is used.

The weight of the truck is supported on wheels, preferably four in number, two designated at 31—31 being mounted in the middle of the body on brackets secured fast to the bottom of the truck, so that the axes of the wheels are fixed with respect to the body while two others 32—32 are located at the opposite ends and are swivelled. This enables the truck to be rolled to the desired point and turned around within its own length.

Preferably, as above stated, the truck is made entirely of metal. The casing 5 and the plates which enclose the chamber below the casing usually are made of Monel metal, all the metal parts being polished. The casing joints are sealed by solder so that all the surfaces of the apparatus on which food could lodge are readily accessible and can be easily cleaned. It is a simple matter, therefore, to keep the apparatus in an entirely sanitary condition. The apparatus can be manufactured economically, and it is so sturdy and substantial in construction that depreciation and wear are reduced to a minimum.

While I have herein shown and described the best embodiment of my invention which I have so far devised, it will be appreciated that this embodiment may be modified in many particulars without departing from the spirit or scope of the invention.

Having thus described my invention, what I desire to claim as new is:

1. In a food conveying apparatus, the combination of a casing having substantially flat metal top plate, forming a cover for the entire casing, and having an opening therein, a pocket within said casing to receive a food container, said pocket comprising two sheet metal vessels supported in spaced non-conducting relationship throughout, one within the other, the upper edge of the outer vessel being secured to the lower side of the top plate, and the top of the inner vessel having an interlocking joint with said top plate around the edge of the opening whereby a sealed air space is provided between said vessels, heat insulating material surrounding the outer vessel and insulating said vessel from the walls of the casing, and a heat insulating cover hinged to said casing for covering the upper end of said pocket.

2. A portable food conveying apparatus comprising a frame formed of upright angle irons connected below the top thereof, plates secured to said frame and cooperating therewith to form a body, a sheet metal casing slidable between said upright irons and positioned thereby, said casing being supported in spaced relation to the bottom of the body, said casing having a pocket therein to receive a food container, means for heat insulating said pocket, a heat insulating cover hinged to said casing and arranged to cover the outer end of said pocket and a chamber in the lower part of said body below the casing.

3. In a food conveying apparatus, the combination of a casing having a substantially flat metal top plate, said casing having a plurality of pockets therein to receive food containers, each of said pockets comprising two sheet metal vessels spaced from each other at all points one within the other, the upper edge of the outer vessel being secured to the lower side of said top plate, and the top of the inner vessel having an interlocking joint with said top plate, whereby a sealed air space is provided between said vessels, a cover for said inner vessel and a heat insulating cover hinged to said casing, said heat insulating cover engaging said top plate and being recessed to fit the vessel cover and adapted to press said vessel cover into sealing engagement with the top edge of the vessel.

CHARLES E. JENKINS.